(12) United States Patent
Cole (10) Patent No.: US 8,079,423 B2
(45) Date of Patent: Dec. 20, 2011

(54) CULTIVATING TOOL

(76) Inventor: George H. Cole, Clovis, CA (US)

( * ) Notice: Subject to any disclaimer, the term of this patent is extended or adjusted under 35 U.S.C. 154(b) by 0 days.

(21) Appl. No.: 12/459,200

(22) Filed: Jun. 25, 2009

(65) Prior Publication Data

US 2010/0326681 A1 Dec. 30, 2010

(51) Int. Cl.
*A01B 1/00* (2006.01)
(52) U.S. Cl. .......................................... 172/371; 81/489
(58) Field of Classification Search ................. 172/371, 172/372, 376, 377; 15/229.6, 244.2; 81/489
See application file for complete search history.

(56) References Cited

U.S. PATENT DOCUMENTS

| | | | | |
|---|---|---|---|---|
| 31,977 A * | 4/1861 | Howard | ....................... | 172/381 |
| 469,359 A * | 2/1892 | Robinson | ..................... | 172/371 |
| 686,845 A * | 11/1901 | Fischer | ......................... | 172/378 |
| 718,571 A * | 1/1903 | Hoodless | ..................... | 172/373 |
| 824,862 A * | 7/1906 | Hilton | .......................... | 172/375 |
| 1,334,586 A * | 3/1920 | Baker | ........................... | 172/372 |
| 1,627,901 A * | 5/1927 | Hills | .............................. | 403/218 |
| 1,886,178 A * | 11/1932 | Goddard | ....................... | 172/372 |
| 2,251,048 A * | 7/1941 | Garland | ......................... | 172/372 |
| 2,579,229 A * | 12/1951 | Erickson et al. | .............. | 172/376 |
| 2,771,019 A * | 11/1956 | Zeitz | .............................. | 172/372 |
| 2,787,204 A * | 4/1957 | Leckenby | ..................... | 172/375 |
| 2,943,690 A | 7/1960 | Towt | | |
| 2,988,157 A * | 6/1961 | Linstaedt | ...................... | 172/376 |
| 3,176,780 A * | 4/1965 | Sommer | ........................ | 172/377 |
| 3,739,562 A * | 6/1973 | McNamara | ................ | 56/400.06 |
| 3,942,591 A * | 3/1976 | Brannin | ......................... | 172/371 |
| 3,965,991 A * | 6/1976 | Eads et al. | ..................... | 172/376 |
| 4,093,031 A | 6/1978 | Portz | | |
| 4,305,470 A * | 12/1981 | Anderson | ........................ | 172/41 |
| 4,377,212 A | 3/1983 | Malson, Sr. | | |
| 4,658,461 A * | 4/1987 | Roe et al. | ..................... | 15/210.1 |
| 4,794,663 A * | 1/1989 | Vosbikian | .................... | 15/229.6 |
| 5,097,910 A * | 3/1992 | Traczek | ........................ | 172/375 |
| 5,390,746 A * | 2/1995 | Page | ............................. | 172/371 |
| 5,414,889 A * | 5/1995 | Sartori | ......................... | 15/159.1 |
| D359,206 S * | 6/1995 | Bojar | ............................... | D8/11 |
| 5,557,852 A * | 9/1996 | Frisina | ............................ | 30/167 |
| 5,720,071 A * | 2/1998 | Hall | ............................. | 15/236.08 |
| 6,152,241 A * | 11/2000 | Johnson | ........................ | 172/371 |
| 6,415,874 B1 * | 7/2002 | Gritzmacher | ................. | 172/371 |
| 2001/0037886 A1 * | 11/2001 | Johnson | ......................... | 172/377 |
| 2002/0112865 A1 * | 8/2002 | Murtagh | ....................... | 172/371 |

\* cited by examiner

*Primary Examiner* — Thomas Will
*Assistant Examiner* — Jamie L McGowan
(74) *Attorney, Agent, or Firm* — Richard A. Ryan (57) ABSTRACT

A cultivating tool for removing weeds and unwanted grass and for cultivating ground around and under an object under which a standard hoe or a hula-type hoe cannot fit. The cultivating tool has a thin scraping blade at the lower end of an elongated handle with a blade assembly interconnecting the handle and an upwardly disposed mounting standard on the upper surface of the scraping blade. The blade assembly includes a mechanism that connects to the lower end of the handle and a pivoting mechanism that pivots the scraping blade relative to the handle. The blade assembly connects the scraping blade to the handle in a manner which maintains the spaced area above both ends of the blade unobstructed so the scraping blade may slide under a plant without harming the plant and under an object to remove weeds and grass.

13 Claims, 5 Drawing Sheets

CULTIVATING TOOL

REFERENCE TO RELATED APPLICATIONS

None.

BACKGROUND OF THE INVENTION

A. Field of the Invention

The field of the present invention relates generally to earth-working tools for use in gardens, landscaped areas, agricultural fields and the like. In particular, the present invention relates to hand cultivating tools that are utilized for preparing the soil for planting and for removing weeds and other growth from around plants and other objects. Even more particularly this invention relates to garden hoes and the like.

B. Background

Hand cultivating tools are generally well known and commonly utilized to work the soil. One such tool is the standard or garden hoe, which has long been an essential gardening tool for the home and commercial gardener to prepare a plot of land for growing fruit, vegetable or ornamental vegetation. The standard hoe, in its simplest form, comprises a long wooden handle having a flat steel blade at its lower end that is positioned generally perpendicular to the handle. Typically, the garden hoe is utilized to manipulate the topsoil, as well as a portion of the subsurface soil, for purposes of aerating the soil, breaking up of large dirt clods and removing weeds and unwanted grasses in order to prepare an area for cultivation or improve a cultivated area. The blade of the standard garden hoe is configured to strike the soil and penetrate its surface so as to cut the roots of the unwanted weeds and grasses and permit the soil to be turned over onto these plants as a way of hindering their growth.

Over the years, a number of improvements have been made to the standard hoe. One such improvement was the introduction of the Hula Hoe. As is well known, this cultivating tool comprises a generally square or rectangular shaped blade portion that attaches to the bottom end of an elongated handle with a U-shaped earth working blade distally disposed from the end of the handle. A pair of side members extend toward the handle from the centrally disposed distal cutting blade portion, which has one or more cutting edges thereon. The side members attach to the ends of a blade support member that extends outward from the end of the handle in spaced apart relation to the distal blade portion to define the generally square or rectangular shape. This common cultivating tool is used to remove grass, weeds and other undesirable plant growth from a garden or other cultivated area by pulling and pushing the hoe, typically in a back and forth motion, across the area to be cleaned such that the cutting blade glides under the soil surface to sever the roots of the undesirable vegetation.

A number of improvements to such hoes have been patented. For instance, U.S. Pat. No. 2,943,690 to Towt describes a pendulum cultivating tool having a U-shaped earth working blade with its upper ends inwardly bent such that they are received inside the ends of an elongated sleeve that is fixedly attached at the end of an elongated handle. The upper ends of the U-shaped blade and the open ends of the elongated sleeve are cooperatively sized and configured such that the U-shaped blade pivots relative to the sleeve to provide a pendulum action for the blade. The amount of the pendulum movement of the blade is limited by the engagement of its ends with the open ends of the sleeve. U.S. Pat. No. 4,093,031 to Portz describes a pendulum type hoe that also has a U-shaped blade which pivots in relation to the handle. Each of the upper ends of the blade engage a slot in a bracket attached to and extending downward from the end of the handle. The slots are sized and configured to allow the ends of blade to pivot in relation to the brackets. U.S. Pat. No. 4,377,212 to Malson, Sr. describes a pendulum action cultivating hoe having a U-shaped blade that is pivotally attached to a downward turned U-shaped bracket which is fixedly attached to the end of a handle. Each of the downward side arms of the bracket have an upwardly curved slot which slidably receives a rod that is attached to the U-shaped blade to allow the blade to pivot relative to the bracket.

One of the primary limitations of the prior art standard hoe and the cultivating hoes described above is that they are difficult, if not nearly impossible, to effectively utilize around the bottom of plants which have low hanging growth or along the side of objects, such as rocks, decorative stones, benches, walls or the like where it is necessary to get under the edge of the object to remove weeds, grass or other unwanted vegetation. As well known to those who work in gardens or fields, weeds or grass will often grow along the bottom of a plant in an area under a portion of the plant. Use of a standard hoe or one of the hula-type hoes in this area has a significant risk of damaging the plant or any fruit or vegetables that may be growing thereon. Around objects such as decorative rocks, walls or other structures, a standard hoe or one of the U-shaped hoes described above is unable to get under or at the edge of the object to remove unwanted vegetation. The primary impediment to use of the standard hoe in either of the circumstances described above is the depth of the relatively large flat blade, which can damage the cultivated plant when trying to remove unwanted vegetation or which cannot be positioned sufficiently under or along the object to remove the unwanted vegetation. The primary impediment to the use of the hula-type hoe in these circumstances is the upwardly extending side arm members of the U-shaped blade, which can damage the cultivated plant and prevents the cutting edge of the blade from getting under or along the edge of the object.

What is needed, therefore, is an improved cultivating tool that has the benefits of the prior art hoes but which is configured to easily fit around and under plants and under the edge of objects to remove weeds, grass and other unwanted vegetation therefrom. More specifically, what is needed is an improved cultivating tool that achieves the hand-weeding and soil manipulation benefits of a standard garden hoe with the ergonomic advantages of a hula or oscillating hoe and which can be utilized around or under a cultivated plant without harming the plant and under the edge of objects to more effectively remove weeds, grass and other unwanted vegetation from a cultivated area. The preferred cultivating tool should be lightweight and configured in a manner that results in a relatively inexpensive tool to manufacture.

SUMMARY OF THE INVENTION

The cultivating tool of the present invention provides the benefits and solves the problems disclosed above. That is to say, the present invention discloses a cultivating tool which provides the effectiveness and precision of hand-weeding and soil manipulation of a standard garden hoe with the ergonomic advantages of a hula or oscillating hoe to remove weeds or grass from around and under a plant or under the edge of an object in a cultivated or landscaped area. The cultivating tool of the present invention has a relatively narrow, thin scraping blade that is attached at or near its middle to the lower end of an elongated handle such that the distal ends of the blade extend outwardly from the handle so they may easily fit under a cultivated plant or the edge of a decorative stone, bench, building or other object to remove unwanted weeds and grass. In the preferred embodiment, the cultivating tool is manufactured out of materials that provide a lightweight, easy to handle tool and which allow the tool to be relatively inexpensively manufactured.

In one general aspect of the present invention, the cultivating tool comprises an elongated handle having an upper or first end and a lower or second end and a relatively thin narrow scraping blade disposed at the second end of the handle. The scraping blade can be fixed relative to the handle. In the preferred embodiment, however, the cultivating tool also comprises means for pivoting the scraping blade relative to the handle to provide the ergonomic benefits of pendulum motion that assists the user with the back and forth action of a hoe. The cultivating tool has a mounting standard which extends upwardly from the upper surface of the scraping blade such that the first and second ends of the scraping blade extend outwardly from the mounting standard to define an open, unobstructed spaced area above each of the ends of the scraping blade. In the preferred embodiment, the mounting standard is disposed generally toward the center of the scraping blade. A blade assembly interconnects the lower end of the handle and the mounting standard. The blade assembly comprises a handle securing means at the lower end of the handle that secures the blade assembly to the handle, a pair of brace members that interconnect the mounting standard and the handle securing means and the pivoting means that pivots the scraping blade relative to the handle to provide the desired articulation motion.

In a preferred embodiment, the pivoting means comprises a first connecting member that passes through apertures in the mounting standard and the brace members to define a pivoting point about which the mounting standard pivots. In one embodiment, the pivoting motion is achieved by use of a second connecting member that is received through a second set of apertures in the mounting standard and the brace members, with the aperture in the mounting standard being larger than the other apertures to allow articulation of the mounting standard relative to the brace members and the scraping blade relative to the handle. In an alternative embodiment, the pivoting is achieved by use of a plate member having an end which extends outwardly from the lower end of the handle to cooperatively engage an upper end of the mounting standard to allow limited articulation of the scraping blade. In the preferred embodiment, the end of the plate member and the upper end of the mounting standard have a clevis-like configuration. Preferably, the pivoting means is configured to limit the pivoting motion of the scraping blade to approximately two to five millimeters so that the cultivating tool can be used without significant risk of injury to the user or damage to cultivated plants.

In use, the cultivating tool of the present invention is held relative to the ground in a conventional manner, such as one holds a standard hoe or a hula hoe, with the handle at an angle and with the scraping blade positioned on the ground. The user moves the blade back and forth across the ground, typically with the scraping blade just under the surface. The articulating motion of the scraping blade allowing the user to change direction without changing his or her body position. Due to the thin and narrow configuration of the scraping blade, the cultivating tool can be utilized to remove weeds and grass from around or under plants having vegetation that would otherwise be damaged by a standard hoe or by the hula-type hoes. In addition, the thin and narrow configuration of the scraping blade allows the user to place an end of the blade under the edge of a decorative stone, wall, sprinkler or other object to remove weeds or grass which may be growing therefrom.

It is therefore the primary objective of the present invention to provide an improved cultivating tool that provides the advantages discussed above and overcomes the disadvantages and limitations which are associated with presently available hoes that are utilized for soil cultivation. It is also an important objective of the present invention to provide a cultivating tool that is configured with a scraping blade which can be utilized around and under plants having low hanging plant material and under the edge of decorative stones, walls, sprinkler equipment and/or other objects to remove weeds and grass growing therefrom. It is also an important objective of the present invention to provide a cultivating tool that has a thin, narrow scraping blade which is pivotally attached to the lower end of an elongated handle to provide the ergonomic benefits of pendulum action hoes while allowing the scraping blade to fit under cultivated plants having low hanging plant material and under the edge of objects located in or next to the cultivated area to remove weeds and grass therefrom. It is also an important objective to provide a cultivating tool that is lightweight, easy to use and capable of being inexpensively manufactured.

The above and other objectives of the present invention will become readily apparent and are explained in greater detail by reference to the attached figures and the description of the preferred embodiment which follows. As forth herein, the present invention resides in the novel features of form, construction, mode of operation and/or combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are illustrative of preferred embodiments and are intended to merely represent several different ways of configuring the present invention. Although specific components, materials, configurations and uses are illustrated, it will be understood that a number of variations to the components and to the configuration of those components described herein and in the accompanying figures can be made without changing the scope and function of the invention set forth herein. For purposes of this disclosure, reference is made to use of the present invention as a hoe-like tool, however, those skilled in the art will readily understand that the present invention may have similar earth working, cutting and tilling uses.

Figure 1:
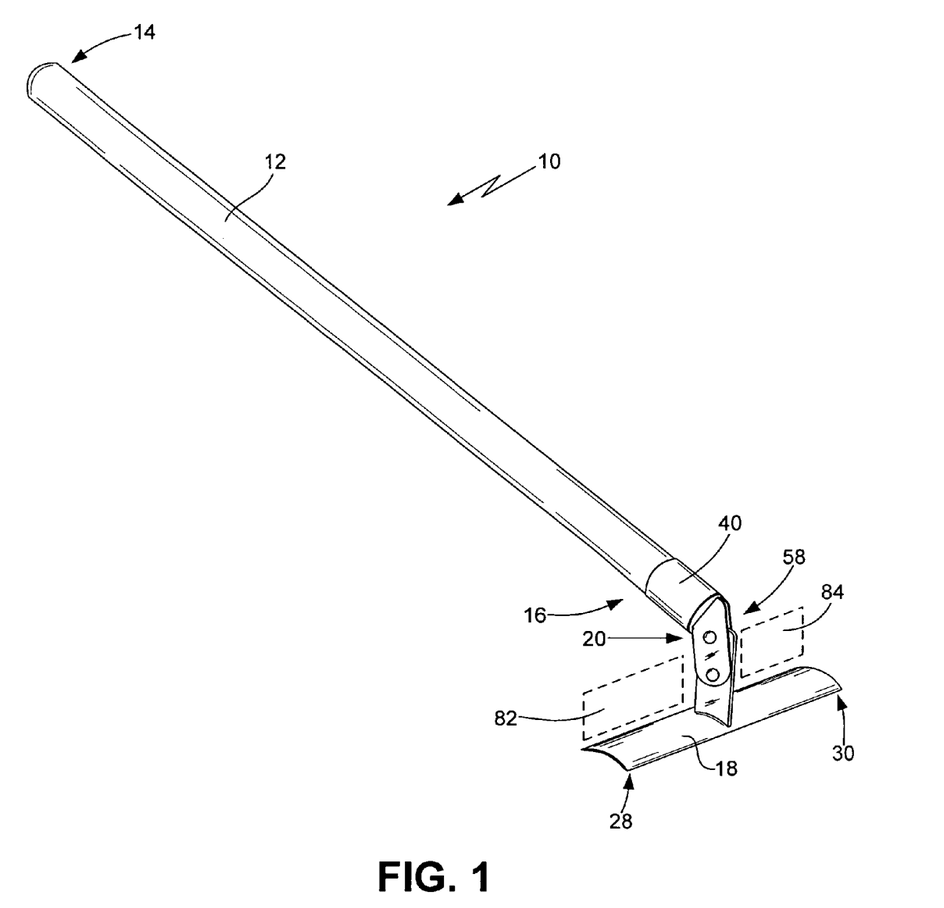
FIG. 1 is a side perspective view of a cultivating tool configured according to the principles and concepts of a preferred embodiment of the present invention.
Figure 2:
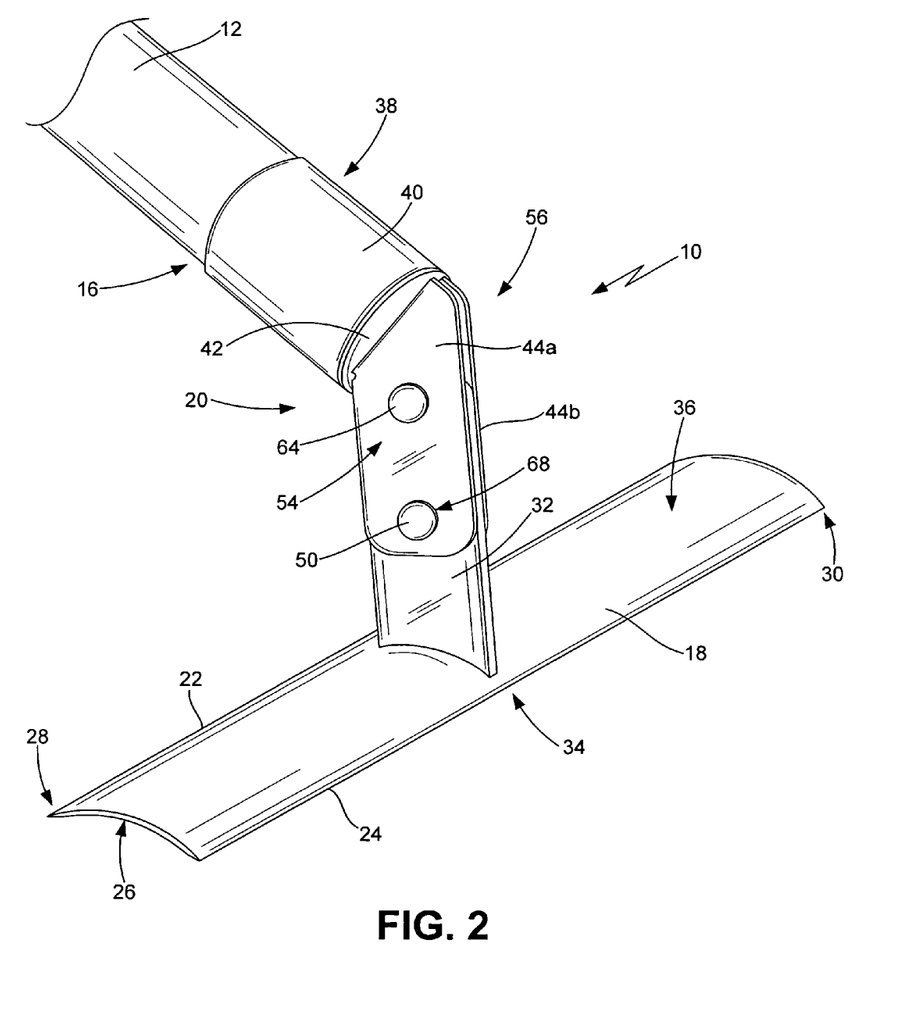
FIG. 2 is a side perspective view of the lower end of the cultivating tool of FIG. 1 with the blade assembly shown in its aligned position.

A cultivating tool that is manufactured out of the components and configured pursuant to a preferred embodiment of the present invention is shown generally as 10 in the figures. As best shown in FIG. 1, cultivating tool 10 of the present invention has an elongated handle 12, having a first or upper end 14 and a second or lower end 16, and a scraping blade 18 attached at the lower end 16 of handle 12. In the preferred embodiment, the cultivating tool 10 has a blade assembly 20 that mounts scraping blade 18 to the lower end 16 of handle 12 and, in the preferred embodiment, is configured to allow at least a slight amount of pivoting or pendulum movement of scraping blade 18 relative to handle 12. As well known in the art, handle 12 can be constructed from wood, metal, fiberglass, plastic or a number of other materials that have sufficient strength to support the forces that will be applied to the scraping blade 18 by the user of cultivating tool 10 while providing the preferred lightweight nature of the present invention. In a preferred embodiment, handle 12 is sized and configured to allow the user to hold handle 12 in his or her hand and to utilize cultivating tool 10 while in a standing position. Typically, a handle length of approximately five feet will be sufficient.

Scraping blade 18 is preferably made out of metal or like material having sufficient strength to be utilized as a hoe-type tool and to provide at least one generally sharp scraping edge 22, as best shown in FIGS. 2 through 5. In the preferred embodiment, scraping blade 18 has a first scraping edge 22 and a second scraping edge 24 to provide the desirable scraping action in both the rearward (pulling) and forward (pushing) directions so cultivating tool 10 can be beneficially utilized in a back and forth motion common to a scraper type of hoe. Although scraping blade 18 could be generally flat, in the preferred embodiment scraping blade 18 has a lower concave surface 26, which adds rigidity to the narrow scraping blade 18. Preferably, concave surface 26 is configured such that the lower edges of scraping edges 22 and 24 are generally in the same plane. Also in the preferred embodiment, the scraping edges 22/24 extend completely along the length of scraping blade 18 from its first end 28 to its second end 30. As shown in the figures, the first end 28 and second end 30 extend outwardly from one or more mounting standards 32 (one shown) located at or near the center 34 of scraping blade 18. Mounting standard 32 extends upwardly from the upper surface 36 of scraping blade 18. Mounting standard 32 can be made out of the same material used for scraping blade 18 and, if desired, mechanically formed with scraping blade 18 or formed separately and then fixedly attached to the upper surface 36 by welding or other means that are appropriate for the materials utilized for scraping blade 18 and mounting standard 32. As set forth in more detail below, in the preferred embodiment blade assembly 20 attaches to the mounting standard 32 to secure scraping blade 18 to the lower end 16 of handle 12 and mounting standard 32 and blade assembly 20 are cooperatively configured to allow the scraping blade 18 to articulate relative to handle 12.

In addition to mounting standard 32, blade assembly 20 comprises a handle securing means 38 that is sized and configured to secure blade assembly 20 to the lower end 16 of handle 12. In the embodiments of FIGS. 1 through 4, the handle securing means 38 comprises a tubular member 40 sized to receive the lower end 16 of handle 12 therein and tightly frictionally engage the lower end 16 of handle 12. If desired, a bolt, screw or other connector can be inserted through tubular member 40 and into or through handle 12 to further secure tubular member 40 to the lower end 16 of handle 12. As best shown in FIG. 4, a cap member 42 is secured to the lower end of tubular member 40 and one or more brace members 44 extend outwardly and downwardly from cap member 42 to connect with the mounting standard 32. If desired, tubular member 40 and cap member 42 can be integrally formed. In the embodiment of FIGS. 1 through 4, a pair of spaced apart brace members, shown as 44a and 44b, are utilized. Brace members 44a/44b are disposed in spaced apart relation to receive the mounting standard 32 therebetween. In a preferred embodiment, brace members 44a/44b are spaced apart a distance sufficient for mounting standard 32 to pivotally move relative to the brace members 44a/44b. Preferably, the various components of blade assembly 20, including mounting standard 32, are made out of lightweight metals and coated or otherwise treated to reduce the likelihood of corrosion.

As best shown in FIG. 4, mounting standard 32 has one or more mounting apertures, such as first mounting aperture 46, and brace members 44a/44b each have one or more brace apertures, such as first brace aperture 48, that is sized to receive first connecting mechanism 50 to secure mounting standard 32 to blade assembly 20. The first connecting mechanism 50, which can be a rivet (shown), bolt, screw or other devices used to connect such components together, has shaft 52 that is received through the first mounting aperture 46 and the first brace aperture 48. In one embodiment, first mounting aperture 46, first brace aperture 48 and first connecting mechanism 50 are cooperatively configured to secure mounting standard 32 between brace members 44a/44b and place scraping blade 18 in a fixed position relative to handle 12. In the preferred embodiment, however, blade assembly 20 comprises a pivoting means 54, set forth below, that allows the scraping blade 18 to pivot relative to handle 12. In the embodiment of FIGS. 1 through 4, first mounting aperture 46, first brace aperture 48 and first connecting mechanism 50 are cooperatively configured to allow the mounting standard 32 to pivot between the brace members 44a and 44b so that scraping blade 18 may move between the aligned position 56 shown in FIG. 2 and the pivoted position 58 shown in FIG. 3.

Figure 3:
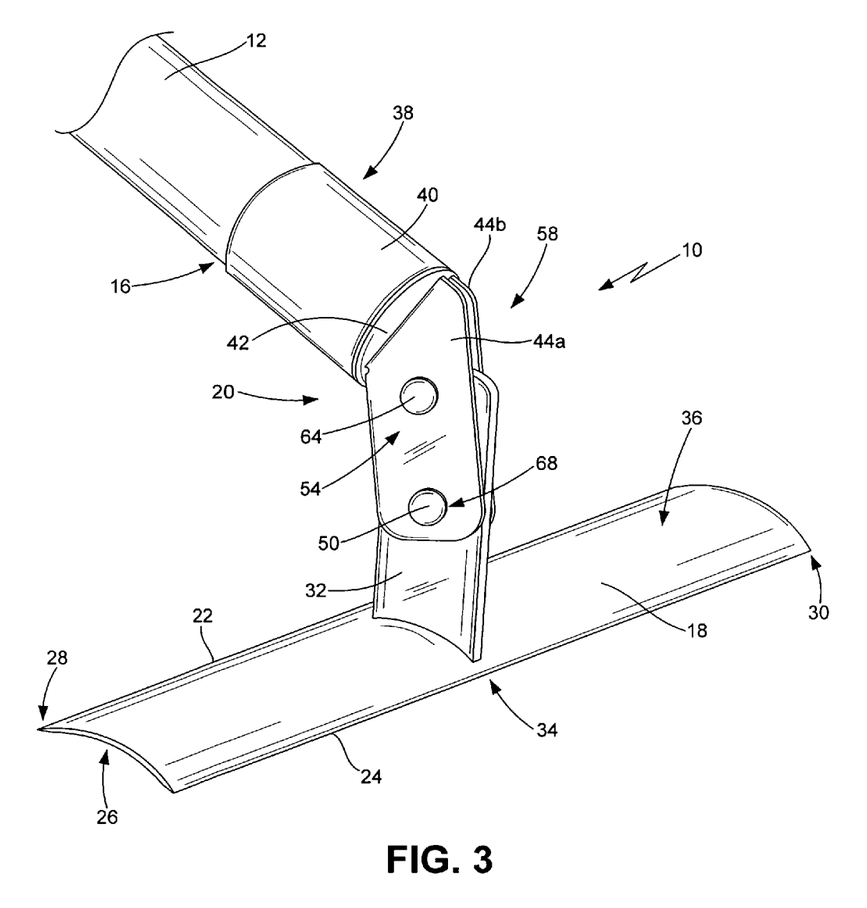
FIG. 3 is a side perspective view of the lower end of the cultivating tool of FIG. 1 with the blade assembly shown in its tilted position.
Figure 4:
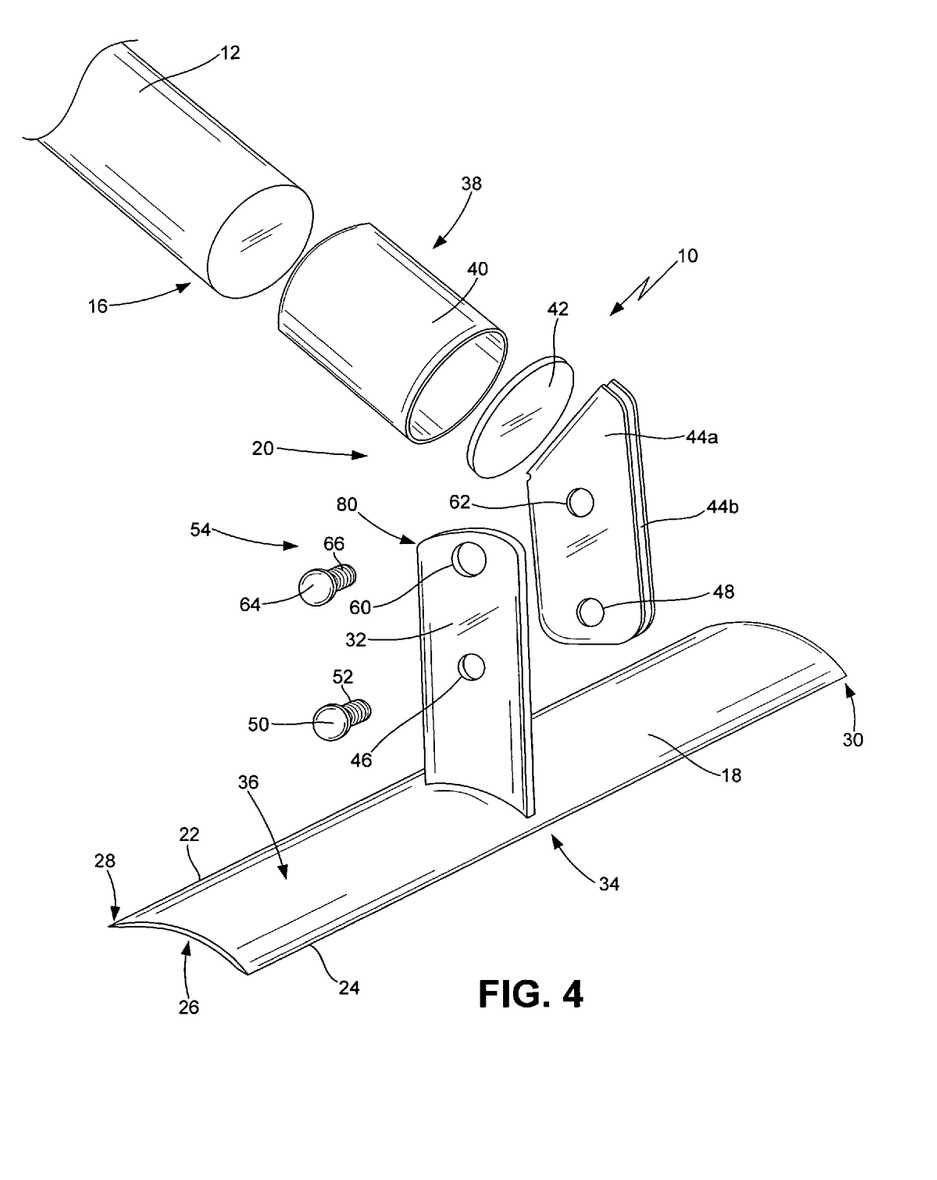
FIG. 4 is an exploded view of the lower end of the cultivating tool of FIG. 1.

In the embodiment of FIGS. 1 through 4, the pivoting means 54 comprises a second mounting aperture 60, a second brace aperture 62 and a second connecting mechanism 64, which has an outwardly extending shaft 66. As best shown in FIG. 3, the second mounting aperture 60 is positioned above (i.e., toward handle 12) the first mounting aperture 46 and it has a width (for the embodiment shown in the figures, the width is the diameter of the round aperture or shaft as may be appropriate) that is greater than the width of the first mounting aperture 46. The width of the second mounting aperture 60 is also greater than the width of the second brace aperture 62 and the width of shaft 66 of the second connecting mechanism 64. The ratio of the width of the second mounting aperture 60 to the width of the shaft 66 is greater than the ratio of the width of the first mounting aperture 46 to the width of shaft 52. In this manner, the mounting standard 32 will pivot at pivoting point 68 defined by first connecting mechanism 50. The amount of pivoting allowed for mounting standard 32, and therefore the scraping blade 18, is controlled by the width of the second mounting aperture 60 relative to the width of the shaft 66 of connecting mechanism 64. The size of the second mounting aperture 60 should not be so large, relative to the width of the mounting standard 32 itself, that failure of the material for mounting standard 32 as a result of forceful and/or repeated contact by shaft 66 would be likely. In one embodiment, the lower first mounting aperture 46 is approximately 0.25 inches in diameter and the upper second mounting aperture 60 is approximately 0.5 inches in diameter.

Figure 5:
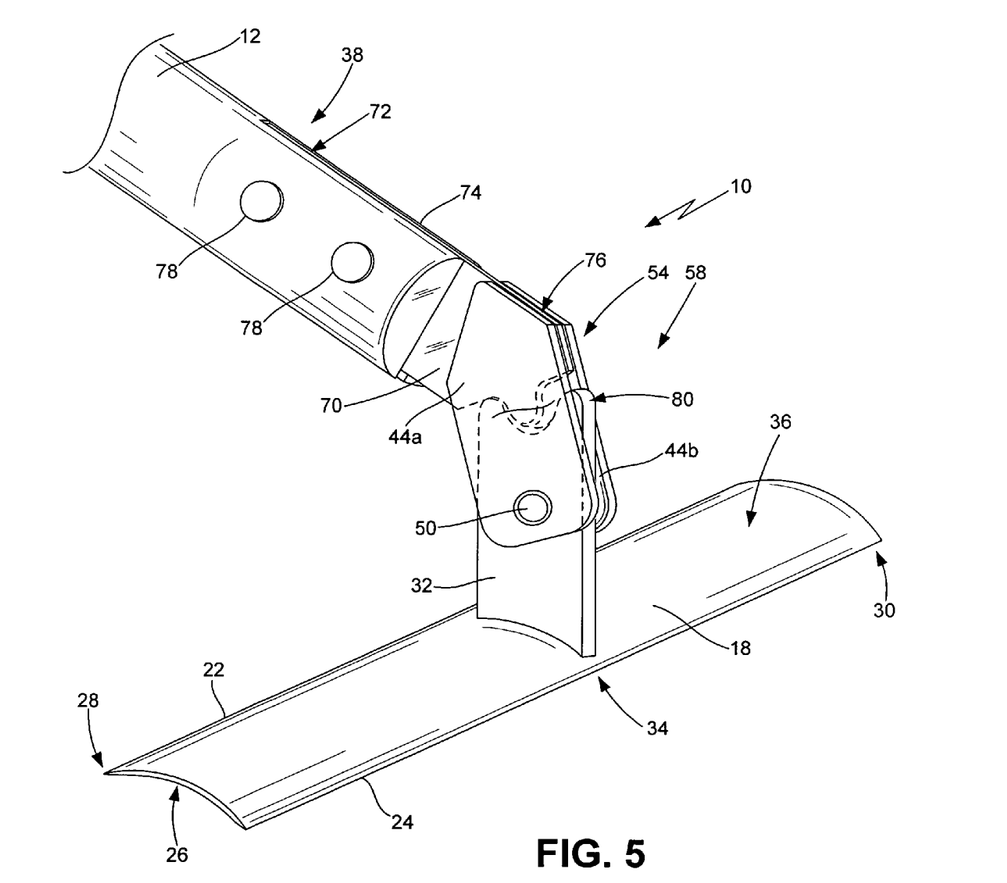
FIG. 5 is a side view of the lower end of an alternative embodiment of the cultivating tool of the present invention shown in its tilted position.

In an alternative embodiment of the cultivating tool 10 of the present invention, shown as FIG. 5, both the handle securing means 38 and the pivoting means 54 are configured differently than the embodiment set forth above and shown in FIGS. 1 through 4. The handle securing means 38 of the embodiment shown in FIG. 5 comprises a plate member 70 having a first end 72 that is received in a slot 74 that is provided at the lower end 16 of handle 12. The second end 76 of plate member 70 extends outward from the lower end 16 to be received between the pair of brace members 44*a* and 44*b*. Preferably, plate member 70 is secured to handle 12 in slot 74 by use of one or more attachment mechanisms 78, such as the two shown, which is preferably a screw, bolt, rivet or other mechanical connector. Alternatively, depending on the materials, certain adhesives or the like may adequately hold plate member 70 in slot 74. The pivoting means 54 of the embodiment of FIG. 5 utilizes the outwardly extending second end 76 of plate member 70 and a cooperatively configured upper end 80 of the mounting standard 32 to allow limited articulation of scraping blade 18 relative to handle 12. In the preferred configuration of this embodiment, the second end 76 of plate member 70 and the upper end 80 of mounting standard 32 define a clevis-like configuration wherein the mounting standard 32 is allowed to pivot, at pivoting point 68, relative to the second end 76 of plate member 70 until it hits against the opposing component. In the embodiment shown, the second end 76 of plate member 70 extends outward in a male configuration to be received in the cooperatively configured female configuration of the upper end 80 of mounting standard 32. Alternatively, the configuration of these components can be reversed.

As stated above, preferably the scraping blade 18 is made out of a relatively thin strong material. In one embodiment, the scraping blade 18 is made out of stainless steel and is approximately 0.05 inches thick, 7.0 inches long and 1.2 inches wide. Although somewhat thicker, longer and wider scraping blade 18 can be utilized (e.g., 0.1 to 0.3 inches thick, 7.0 to 15.0 inches long and 1.2 to 2.0 inches wide) with the cultivating tool 10 of the present invention, the scraping blade 18 must be configured to have a relatively low side profile, such as the height between the downwardly disposed scraping edges 22/24 and the arched upper surface 36 resulting from the concave lower surface 26, so the first 28 and second 30 ends of the scraping blade 18 can fit under cultivated plants and objects to remove weeds and grass therefrom. With the mounting standard 32 disposed at or near the center 34 of scraping blade 18, the cultivating tool 10 will have a spaced area 82 and 84 above each of the first end 28 and second end 30, respectively, that will be unobstructed by any support components of cultivating tool 10 so that the ends 28/30 may remove weeds and grasses without damaging a cultivated plant having low hanging plant components and remove weeds and grass from under an object such as a decorative rock, wall, fence, sprinkler unit or the like. The use of open spaced areas 82/84 prevent contact with cultivated plants and with objects while allowing the user to easily remove unwanted weeds and grass.

The cultivating tool 10 of the present invention is hand operated by positioning handle 12 at an angle relative to the ground and moving it across the soil to be cultivated or otherwise over the area to be worked. Scraping blade 18 is position on or just above the ground and the user manually controls the depth of penetration of the scraping blade 18 into the top soil as well as the range of the area covered, thereby assuring unwanted weeds and grass are cut or loosened as well as the amount of top soil tilled. As will be readily understood, the scraping blade 18 will cut the weeds or grass to be removed on the back movement (i.e., toward the user) of the cultivating tool 10 and then pivot to cut going forward or away from the user without the user having to change his or her body position, thereby reducing fatigue and the likelihood of injury. The thin, elongated scraping blade 18 will better cut off the weed or grass at its crown and be much less prone to plugging up when cutting through heavier foliage, such as tall weeds and the like, than the present hula-type hoes. If desired, the user can turn the cultivating tool 10 on its side to drive the outside edge of the first 28 or second 30 ends into the ground to remove a particularly stubborn weed. Preferably, the various components for the cultivating tool of the present invention are chosen to be lightweight for ease of use, sufficiently strong to enable the user to accomplish the desired tasks and economical to manufacture.

Thus, although there is shown and described herein a specific form of the invention, it will be readily apparent to individuals skilled in the art that the present invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. A cultivating tool, comprising:

an elongated handle having an upper end and a lower end;

a narrow scraping blade disposed at said lower end of said handle, said scraping blade having a first end, a second end, a upper surface, a lower surface and one or more scraping edges;

a mounting standard extending upwardly from said upper surface of said scraping blade disposed generally toward the center of said scraping blade with said first end and said second end of said scraping blade extending outwardly therefrom and defining a spaced area above each of said first end and said second end of said scraping blade;

a blade assembly interconnecting said lower end of said handle and said scraping blade, said blade assembly comprising a handle securing means at said lower end of said handle for securing said blade assembly to said handle and one or more brace members interconnecting said mounting standard and said handle securing means; and pivoting means for pivoting said scraping blade relative to said handle, said pivoting means configured to allow said scraping blade to articulate relative to said handle during use of said cultivating tool, said pivoting means comprising a first connecting member received through a first mounting aperture in said mounting standard and a first brace aperture in each of said one or more brace members and a second connecting member received through a second mounting aperture in said mounting standard and through a second brace aperture in each of said one or more brace members, said first connecting member defining a pivoting point about which said mounting standard pivots relative to said one or more brace members, the ratio of the width of said second mounting aperture to the width of a shaft of said second connecting member being greater than the ratio of the width of said first mounting aperture to the width of a shaft of said first connecting member to allow articulating movement of said mounting standard about said pivoting point, wherein said scraping blade is supported at the lower end of said handle by said mounting standard with the spaced area above each of said first end and said second end of said scraping blade being unobstructed.

2. The cultivating tool of claim 1, wherein said lower surface of said scraping blade is concave and said scraping blade comprises a first scraping edge and a second scraping edge, said scraping blade narrowly configured between said first scraping edge and said second scraping edge.

3. The cultivating tool of claim 2, wherein said scraping blade is approximately 1.2 to 2.0 inches wide and approximately 7.0 to 15.0 inches long.

4. The cultivating tool of claim 1, wherein said blade assembly comprises a pair of brace members, said pair of brace members disposed in spaced apart relation with said mounting standard disposed therebetween.

5. The cultivating tool of claim 1, wherein said second mounting aperture is disposed toward an upper end of said mounting standard above said first mounting aperture.

6. The cultivating tool of claim 1, wherein said handle securing means comprises a slot in said lower end of said handle and a plate member having a first end received in said slot and said pivoting means further comprises a second end of said plate member extending outwardly from said lower end of said handle and configured to cooperatively engage an upper end of said mounting standard to allow limited articulating movement of said mounting standard and said scraping blade.

7. The cultivating tool of claim 6, wherein said second end of said plate member is received between a pair of said brace members.

8. A cultivating tool, comprising:
an elongated handle having an upper end and a lower end;
a scraping blade disposed at said lower end of said handle, said scraping blade having a first end, a second end, a upper surface, a lower surface, a first scraping edge and a second scraping edge, said lower surface being concavely shaped, said scraping blade narrowly configured between said first scraping edge and said second scraping edge;
a mounting standard extending upwardly from said upper surface of said scraping blade disposed generally toward the center of said scraping blade with said first end and said second end of said scraping blade extending outwardly therefrom and defining a spaced area above each of said first end and said second end of said scraping blade; and
a blade assembly interconnecting said lower end of said handle and said mounting standard, said blade assembly comprising a handle securing means at said lower end of said handle for securing said blade assembly to said handle, one or more brace members interconnecting said mounting standard and said handle securing means and a pivoting means for pivoting said scraping blade relative to said handle, said pivoting means configured to allow said scraping blade to articulate relative to said handle during use of said cultivating tool, said pivoting means comprising a first connecting member received through a first mounting aperture in said mounting standard and a first brace aperture in each of said one or more brace members and a second connecting member received through a second mounting aperture in said mounting standard and through a second brace aperture in each of said one or more brace members, said first connecting member defining a pivoting point about which said mounting standard pivots relative to said one or more brace members, the ratio of the width of said second mounting aperture to the width of a shaft of said second connecting member being greater than the ratio of the width of said first mounting aperture to the width of a shaft of said first connecting member to allow articulating movement of said mounting standard about said pivoting point, wherein said scraping blade is supported at the lower end of said handle by said mounting standard with the spaced area above each of said first end and said second end of said scraping blade being unobstructed.

9. The cultivating tool of claim 8, wherein said handle securing means comprises a tubular member sized and configured to receive said lower end of said handle.

10. The cultivating tool of claim 8, wherein said blade assembly comprises a pair of brace members, said pair of brace member disposed in spaced apart relation with said mounting standard disposed therebetween.

11. The cultivating tool of claim 8, wherein said handle securing means comprises a slot in said lower end of said handle and a plate member having a first end received in said slot and said pivoting means further comprises a second end of said plate member extending outwardly from said lower end of said handle and configured to cooperatively engage an upper end of said mounting standard to allow limited articulating movement of said mounting standard and said scraping blade.

12. A cultivating tool, comprising:
an elongated handle having an upper end and a lower end;
a scraping blade disposed at said lower end of said handle, said scraping blade having a first end, a second end, a upper surface, a lower surface, a first scraping edge and a second scraping edge, said scraping blade narrowly configured between said first scraping edge and said second scraping edge;
a mounting standard extending upwardly from said upper surface of said scraping blade with said first end and said second end of said scraping blade extending outwardly from said mounting standard to define a spaced area above each of said first end and said second end of said scraping blade; and
a blade assembly interconnecting said lower end of said handle and said mounting standard, said blade assembly having one or more brace members connected to said mounting standard and a pivoting means for pivoting said scraping blade relative to said handle, said pivoting means configured to allow said scraping blade to articulate relative to said handle during use of said cultivating tool, said pivoting means comprising a first connecting member received through a first mounting aperture in said mounting standard and a first brace aperture in each of said one or more brace members and a second connecting member received through a second mounting aperture in said mounting standard and through a second brace aperture in each of said one or more brace members, said first connecting member defining a pivoting point about which said mounting standard pivots relative to said one or more brace members, the ratio of the width of said second mounting aperture to the width of a shaft of said second connecting member being greater than the ratio of the width of said first mounting aperture to the width of a shaft of said first connecting member to allow articulating movement of said mounting standard about said pivoting point, wherein said scraping blade is supported at the lower end of said handle by said mounting standard with the spaced area above each of said first end and said second end of said scraping blade being unobstructed.

13. The cultivating tool of claim 12, wherein said pivoting means further comprises a plate member having an end extending outwardly from said lower end of said handle and configured to cooperatively engage an upper end of said mounting standard to allow limited articulating movement of said mounting standard and said scraping blade.

* * * * *